Figure 1:
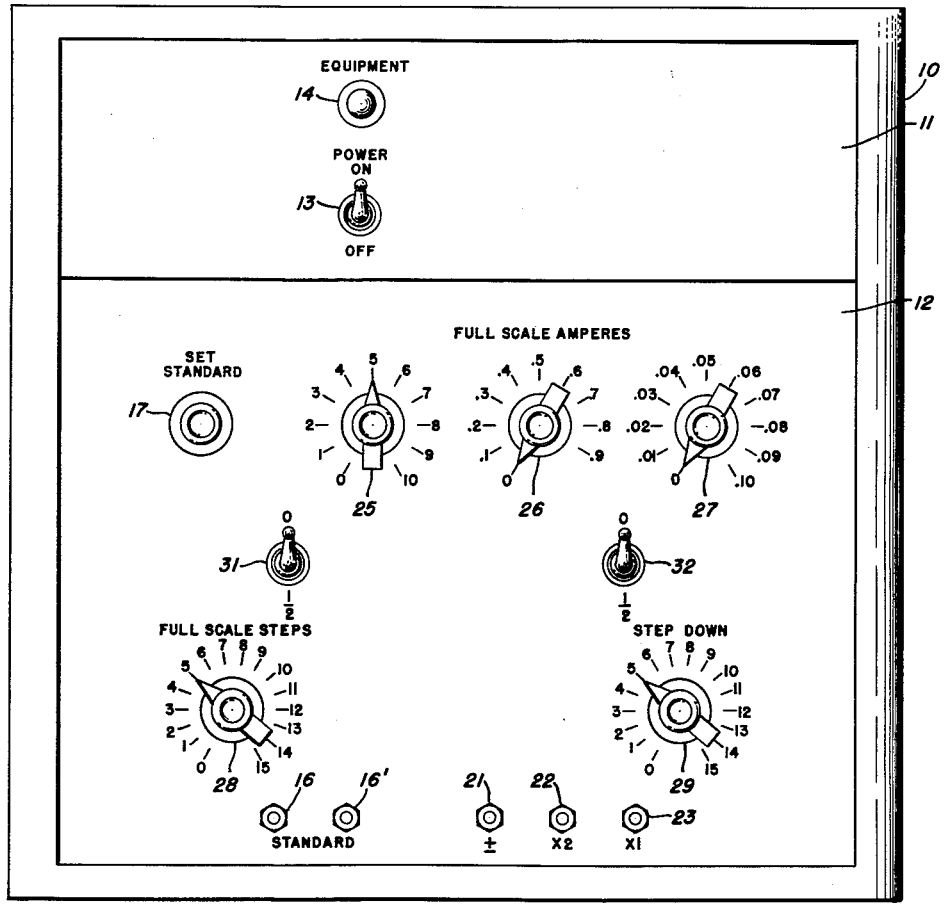

JOHN H. MILLER
INVENTOR.

JOHN H. MILLER
INVENTOR.

BY
Rudolph H. Quick
ATTORNEY

United States Patent Office 3,035,227
Patented May 15, 1962

3,035,227
A.-C. CALIBRATING APPARATUS
John H. Miller, Largo, Fla., assignor, by mesne assignments, to Daystrom, Incorporated, Murray Hill, N.J., a corporation of Texas
Filed Dec. 30, 1958, Ser. No. 783,753
8 Claims. (Cl. 324—74)

This invention relates to an instrument calibrator and more particularly to an A.-C. ammeter calibrating apparatus which includes a cascade arrangement of transformers for supplying selected magnitudes of A.-C. current to an instrument under calibration.

In the electrical field, it is necessary to check the indicating accuracy of A.-C. ammeters or to calibrate the scale thereof in the first instance. Calibrating apparatus of this class is, of course, well known, and may comprise, for example, suitable transformers and like elements, and a standard indicating instrument of high precision arranged whereby accurately measured A.-C. currents may be applied to the A.-C. ammeter under test or calibration. In a calibrating procedure, it is customary to mark the pointer position for from 5 to 15 main or cardinal standardized values of electric current passing through the instrument being calibrated, these values being appropiately selected to cover the range of the instrument scale. The scale itself is then drawn by hand or in a dividing machine, the intermediate scale divisions being interpolated by eye or mechanically. The use of such prior art apparatus, however, requires accurate adjustment of circuit elements for the production of each current output therefrom by observation of the deflection of the standard indicating instrument. Often, two operators were necessary to accurately calibrate the test instrument; one operator would make suitable circuit adjustments while observing the standard indicating instrument and, when the desired calibrating current was obtained, would orally inform the second operator who would then calibrate the test instrument at that instant. Such prior art calibrating procedure is both slow and costly, requiring many hours of labor in the calibration of only relatively few instruments.

With the apparatus of my invention, an accurately maintained predetermined current is fed to the input of a novel cascade arrangement of transformers. Through simple switching arrangements, a wide range of current outputs, appropriate for instrument, calibration, are obtained from the apparatus. Once the apparatus reaches normal operating temperature, in a relatively short time, and adjustment made for the production of the predetermined current, the various desired output currents are obtained by an operator by simple switch settings, without the necessity for further adjustments.

An object of this invention is the provision of apparatus for use in the calibrating of A.-C. ammeters and which includes a novel circuitry whereby output currents of various predetermined values may be obtained therefrom by mere actuation of switches rather than by careful adjustment of circuit elements.

An object of this invention is the provision of an A.-C. instrument calibrator for calibration of ammeters which includes means whereby the cardinal divisions are pointed off through simple switch settings by the operator.

An object of this invention is the provision of an A.-C. ammeter calibrator for pointing off cardinal and intermediate divisions of the instrument, as well as providing for calibrating a half step at the top of the scale.

These and other objects and advantages will become apparent from the following description when taken with the accompanying drawings. It will be understood that the drawings are for purposes of illustration and are not to be construed as defining the scope or limits of the invention, reference being had for the latter purpose to the appended claims.

In the drawings wherein like reference characters denote like parts in the several views:
FIGURE 1 is an elevational view illustrating the front of the cabinet which houses the apparatus of my invention; and
FIGURE 2 is a semi-schematic circuit diagram of the apparatus.

Reference is first made to FIGURE 1 of the drawings wherein a metal cabinet 10 is shown closed by front panels 11 and 12. Normally, the apparatus is energized by means of a connecting cable, not shown, carrying a plug for insertion into an electrical outlet connected to a conventional 120 volt, 60 cycle power line. Power is applied through fuses to a line switch 13, upon closure of which switch the power-on condition is indicated by a signal lamp disposed behind a lens 14. Housed behind the upper panel 11 is a current regulator for production of a closely regulated standard current output of predetermined value. Binding posts 16, 16' adjacent the lower edge of the panel 12 are provided for connection to a suitable high precision ammeter, not shown in FIGURE 1. The ammeter connected to the binding posts 16, 16' is in series circuit relation with the regulated standard current output from the curent regulator within the apparatus. A knob 17 for a variable resistor provides fine control of the standard current through the ammeter. The calibrating current output is obtained from appropriately labeled posts 21—23 to which the A.-C. ammeter under calibration, or test, is connected. The magnitude of the output current from the said output terminals is controlled by means of selector switches controlled by knobs 25—29 and toggle switches 31 and 32.

In operation of the apparatus, the switch knobs 25—27 are set to the full scale amperes of the instrument being calibrated which instrument is connected to the output binding posts 21 and 23. (It will be understood that the output current indicated by the knob settings is multiplied by a factor of two (2) when the output is obtained from the output terminals 21 and 22.) The total number of calibrated divisions, or steps, which are desired on the scale of the ammeter being calibrated is controlled by the switch knob 28, e.g., 15 steps for a 15 ampere instrument, 10 steps for a 2 ampere instrument, and, in general, from 8 to 15 steps of 1, 2, or 5 (or decimal multiples thereof) units. Such steps are then obtained by switching of the knob 29. The switches 31 and 32 are utilized when a half step is required at the top of the instrument scale. Once the normal operating temperature of the apparatus is reached, and the knob 17 adjusted to provide a predetermined current as indicated on an ammeter connected to binding posts 16, 16, highly accurate output currents of various values appropriate for the calibration of instruments are obtained from the apparatus by setting of the switch knobs 25—29 and switches 31 and 32. No further adjustments are necessary during the calibration of instruments so long as the standard current remains constant.

Figure 2:
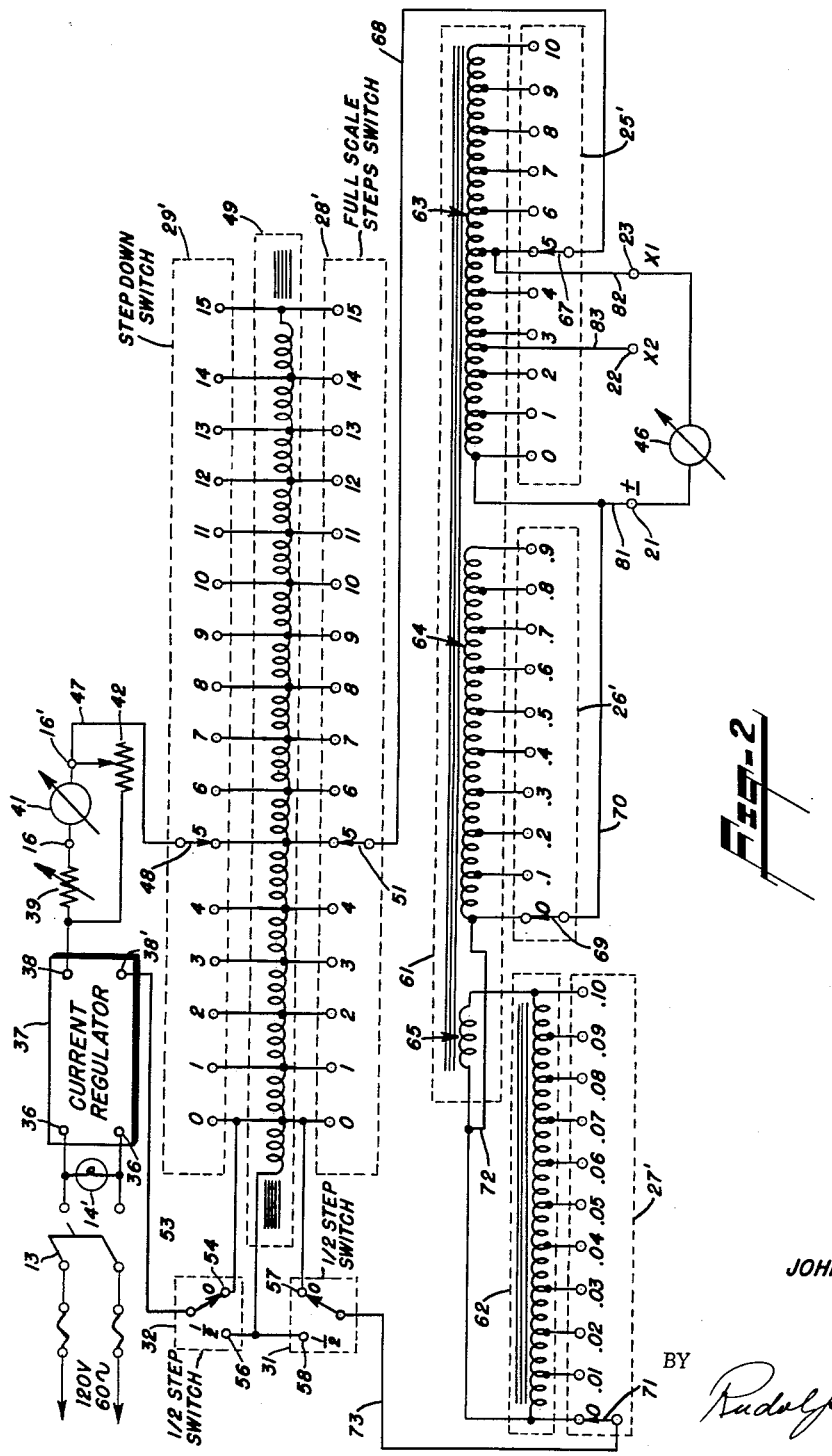

Reference is now made to FIGURE 2 of the drawings wherein the line switch 13, here shown as a double pole single throw switch, is shown in an open position. Closure of the switch causes a signal lamp 14' (positioned behind the lens 14 of FIGURE 1) to be energized. The 120 volt input is connected to the input terminals 36, 36 of a current regulator 37. The current regulator is diagrammatically illustrated in FIGURE 2, since it may be of any suitable design. For purposes of illustration and description, a closely regulated output of five (5) amperes is available from the output terminals 38, 38' of the regulator with a load resistance thereon of from 5 to 5.6 ohms. Outside of these resistance limits, the current output changes gradually due to design limitations of the regulator. Although practically unobtainable, it will be obvious that a regulator which provides a constant current output under all load conditions is desirable. The load on the current regulator includes a nominal 5 ohm adjustable resistor 39 connected between the output terminal 38 and one terminal 16. The five (5) ampere standard current from the regulator is monitored by a suitable high precision A.-C. ammeter 41 connected to the terminals 16, 16′, in series with the resistor 39. The resistor 39 is controlled by the knob 17 and provides adjustment of the regulated current output, as indicated on the meter 41. A high resistance potentiometer 42 is connected across the series connected resistor 39 and ammeter 41 for adjustment for current losses in the following circuit, described hereinbelow. The five (5) ampere standard current is passed through a novel arrangement of transformers and switches to the test instrument 46 to be calibrated which instrument is connected to the output terminals 21 and 23. By proper setting of the various switches, output currents suitable for the calibration of the test instrument are obtained.

As seen in FIGURE 2, the precision ammeter terminal 16′ is connected through a lead wire 47 to the movable contact 48 of a switch 29′, which contact 48 is movable by the "step down" knob 29, shown in FIGURE 1. The stationary contacts of the switch, numbered 0 to 15 to correspond to numerals carried on the front panel 12 and surrounding the knob 29, are connected to taps on a stepping transformer 49 of the current transformer type. Identical numbers of transformer turns are provided between adjacent transformer taps and, in the illustrated embodiment, the taps are located 10 transformer turns apart. For use in calibrating instruments with a half step at the upper end of the scale, the transformer 49 is provided with an additional 5 turns (one-half the number of turns between taps) at the left end thereof, as viewed in FIGURE 2. That is, the transformer tap connected to the stationary contact numbered zero (0) of the switch 29′ is positioned 5 turns from the one end of the transformer winding. In the illustrated embodiment, then a total of 155 turns are provided on the stepping transformer 49.

The equally spaced taps on the stepping transformer 49 are connected also to the stationary contacts, numbered 0–15, of a switch 28′, of identical structure to the switch 29′. The "full scale steps" knob 28, shown in FIGURE 1, is attached to the movable contact 51 of the switch 28′ for movement thereof. Again, it will be noted, that the numerals on the stationary switch contacts of the switch 28′ correspond to the numerals on the front panel 12 surrounding the knob 28. The index pointers of the knobs 28 and 29 are individually alignable with any of the associated panel numerals. In the drawings, the switch arms 48 and 51 are shown connected to the number "5" transformer tap, through the associated stationary contacts of the switches 29′ and 28′.

As shown in FIGURE 2, a lead wire 53 connects the current regulator output terminal 38′ to the movable contact arm of the single pole double throw switch 32. One stationary contact 54, of the switch 32, is connected to the zero (0) tap position of the transformer 49 while the other stationary switch contact 56 is connected to the end of the transformer winding adjacent the said zero (0) tap. The stationary contacts 57 and 58 of a second single pole double throw switch 31 are connected to the respective stationary contacts 54 and 56 of the switch 32. It will be understood that the numerals 0 and ½ located adjacent the stationary switch contacts of the switches 31 and 32 correspond to the marks carried on the front panel 12 adjacent the said switches.

Current from the stepping transformer 49 is fed to main and fine adjustment "full scale set" transformers 61 and 62, respectively, used in setting the full scale current value for the instrument 46 being calibrated. As seen in FIGURE 2, the main transformer includes first, second and third winding sections, designated 63, 64 and 65, respectively. The winding section 63 is provided with a plurality of equally spaced taps which are connected to the stationary contacts, numbered 0 to 10, of a switch 25′. The movable arm 67 of the switch 25′ is fixed to the knob 25 (see FIGURE 1) for actuation thereby. A lead wire 68 connects the movable arm 67 of the switch 25′ to the movable arm 51 of the switch 28′. The stationary contact numerals correspond to numerals carried on the front panel 12 adjacent the knob 25. In the illustrated embodiment, the winding section 63 includes a total of 200 turns whereby 20 turns are between adjacent taps.

The second winding section 64 of the transformer 61, in the illustrated embodiment, includes a total of 18 turns with taps thereon spaced at two turn intervals. (It will be noted that the ratio of turns between taps on the winding sections 64 and 63 is one to ten.) The taps on the winding section 64 are connected to fixed terminals of a switch 26′, having a movable arm 69 controlled by the knob 26 (shown in FIGURE 1). The said fixed terminals are provided with numerals 0, .1, .2, etc., to .9, which correspond to the numerals carried on the front panel 12 adjacent the knob 26, the knob 26 being connected to the movable arm 69 for actuation of the arm. The movable arm 69 is connected through lead wire 70 to one end of the winding section 63.

The third winding section 65 comprises two turns (the same number of turns as provided between adjacent taps on the winding section 64) which are connected across the ends of the interpolating transformer 62. This transformer includes a single winding with a plurality of equally spaced taps. In the illustrated embodiment, a total of twenty (20) turns are included in the winding on the transformer 62 whereby two (2) turns are provided between the adjacent winding taps. Obviously, the total number of turns on the interpolating or fine adjustment transformer is not critical so long as a total of ten (10) equal turn sections are provided thereon whereby ten equal incremental values of current may be fed to the winding section 65 by adjustment of a switch 27′. The taps are connected to fixed terminals of the switch 27′ having a movable arm 71 controlled by the knob 27 (shown in FIGURE 1). The fixed terminals are provided with numerals 0, .01, .02, etc., to .1, which correspond to the numerals carried on the front panel 12 adjacent the knob 27. A lead wire 72 connects one end of the winding sections 64 and 65 together, and the movable arm 71 of the switch 27′ is connected through a lead wire 73 to the movable arm of the switch 31.

The output current through the instrument 46 is derived from the winding section 63. It will be noted that the common ± output terminal 21 is connected to the one end of the winding section 63 through a lead wire 81 while the output terminal 23 is connected to the center of the winding section at the tap connected to the numeral 5 switch contact, through the lead wire 82. An output current double that derived from the terminal 23 is obtained from the X2 terminal 22 connected to a point midway between the one end and the center tap of the said winding section, through lead wire 83.

It will be here noted that all of the transformers are of a high quality whereby the losses therein are extremely small. Transformers having nickel-steel alloy cores have been found suitable for use in the apparatus of my invention.

The operation of the apparatus may best be understood by means of various examples of use. Assume, for example, that the instrument 46 is to be calibrated to five (5) amperes full scale. Since no half step at the top of the scale is desired, the switches 31 and 32 are set at the zero (0) positions, as viewed in the drawings. In these switch positions, the movable switch arms are connected to the zero (0) tap on the stepping transformer 49, as seen in FIGURE 2. Let us assume, further, that the instrument scale is to be provided with five calibrated cardinal divisions. For five (5) such divisions, the step down and "full scale" switches 28' and 29' are set to the numeral five (5) positions. It will be seen, then, that the five (5) ampere regulated current output from the regulator 37 is passed directly through the stepping transformer 49 for application to the main and interpolating transformers 61 and 62. To adjust the instrument 46 to five (5) amperes full scale, the switches 25', 26' and 27' are set to the five (5), zero (0) and zero (0) positions, respectively. It will be seen, then, that the five (5) ampere regulated current output available at the main and interpolating transformers is passed through the zero (0) and five (5) terminals of the switch 25'. Since these terminals are connected directly to the output terminals 21 and 23, the identical five (5) ampere current from the current regulator (less extremely minor losses) will flow through the meter 46 for full scale calibration thereof.

Before describing the switching operations necessary to obtain suitable output currents for calibrating other than the full scale position of the instrument 46, other full scale settings will be described. Assume, for example, that the instrument 46 is to be calibrated to 6 amperes full scale. To obtain 6 amperes output, the movable arm 67 of the switch 25' is set to fixed contact 6 of the switch. With the five (5) ampere regulated input current now applied to 120 turns of the winding section 63 of the transformer 61, an excitation of 600 ampere turns is provided. Since the output is obtained from across 100 turns, six (6) amperes will flow in the output circuit.

In a more complex manner, assume that it is desired to adjust the instrument to 6.87 amperes, full scale, for example. The movable arms of the switches 25', 26' and 27' are set to stationary contacts 6, .8 and .07, respectively. The standard regulated 5 ampere input is thereby passed through 120 turns of the winding section 63, 16 turns of the winding section 64, and effectively 7/10 of two turns, or 1.4 turns of the winding section 65, or a total of 137.4 turns on the transformer 61, for a core excitation of 687 ampere-turns. (The fractional turns are obtained through use of the interpolating transformer connected in shunt relation with the winding section 65. It will be noted that the five (5) ampere standard current passes through 14 turns of the transformer 62, while the output of the transformer is obtained from across the entire 20 turns. The current output is therefore 14/20 of 5 amperes which, in turn, passes through the two turns of the winding section 65 of the transformer 61 to provide 7 ampere-turns of excitation for the transformer 61.) Since the output terminals 21 and 23 are across 100 turns of the transformer 61, 6.87 amperes will flow in the output circuit, as required.

Thus, it will be apparent that, within the limits of turns available and the ability of the transformers to function correctly with negligible losses, the regulated five (5) ampere input current to the transformers 61 and 62 may be transformed to selected values of output current as required.

In addition to providing accurate values of full scale current, the apparatus provides means whereby the cardinal divisions of the instrument are easily pointed off. Predetermined values of current output are available from the apparatus whereby divisions may be applied to the instrument scale to correspond to the exact deflection of the instrument as required to produce the final ammeter scale. The stepping transformer 49 with the associated switches 28' and 29' are utilized in this operation. Continuing the first example, above, it was there assumed that the instrument 46 was to be calibrated to five (5) amperes full scale and pointed off in five (5) cardinal divisions; i.e., at 5, 4, 3, 2, 1 and zero (0) amperes. The full scale ampere switches 25', 26' and 27' were set in the above-described manner to provide a full scale output current of 5 amperes. For five (5) divisions the switches 28' and 29' are initially both set at the numeral 5 contacts. Then, by switching the movable contact 48 of the step down switch 29' to contact numeral 4, four (4) amperes output is obtained from the transformer 49. This results from the fact that the constant standard five (5) ampere output from the regulator 37 is passed through 40 turns of the transformer for an excitation of 200 ampere turns. Since the movable contact 51 of the switch 28' in the output of the transformer 49 remains at the 50 transformer turns, 4 amperes flows in the output. As the movable contact of the switch 29' is moved down to fixed contacts 3, 2, 1 and zero (0) the 3, 2, 1 and zero (0) ampere outputs are obtained for calibration of the instrument 46.

With a total of 15 equal turn winding sections on the transformer 49, it will be apparent that the apparatus may be used in the calibration of an ammeter requiring any number of equal divisions from 1 to 15. Thus, if it is desired to place 10 steps on the 5 ampere range instrument 46, the two switches 28' and 29' are initially both set at contact ten (10) for full scale deflection. The switch arm 48 of the switch 29' is then switched down to the associated contacts 9, 8, 7, etc., for current outputs of 5, 4.5, 4, 3.5, 3, etc., amperes from the transformer 49.

In the calibration of some ammeters, a half step is required at the top of the scale. For example, it may be required to place 10½ steps on a 10½ ampere full scale instrument. The switch arms 48 and 51 of the switches 29' and 28', respectively, are each set to the associated numeral 10 stationary switch contacts by the knobs 29 and 28, and the movable switch arms of the switches 31 and 32 are switched to the stationary contacts 58 and 56, respectively, designated the ½ positions. In the above switch position, the standard 5 ampere current is available at the lead wires 68 and 73 supplying the input to the transformers 61 and 62. The knobs 25, 26 and 27 for the switches 25', 26' and 27' are set to 10, .5, and zero (0), respectively, to set the 10½ ampere full scale calibration mark. The 10 ampere calibration (one half step down from the 10½ ampere full scale output) is then obtained by switching the movable arm of the switch 32 to the stationary contact 54. The five (5) end turns of the transformer 49 are thereby removed from the input circuit of the transformer 49, but not from the output circuit thereof. The remainder of the full scale steps, i.e., 9, 8, 7, etc., are obtained by switching the movable arm 48 of the switch 29' to the stationary contacts 9, 8, 7, etc.

Switchboard ammeters operating from current transformers in larger power systems often require an odd full scale current value, and an odd number of steps thereon, in order that the deflection of the pointer on the instrument truly represents main line currents of many thousands of amperes. For example, it may be required that 13.5 divisions be placed on a switchboard ammeter adjusted to 6.87 amperes full scale value. (The scale may, however, be marked 0–13,500 amperes, e.g.) To produce such instruments with prior art apparatus, it is necessary to proceed through elaborate mathematical calculations to arrive at the actual instrument current for each step at which the instrument is to be calibrated. In the above example, mathematical calculations reveal that the instrument current for the 13th step should be 6.61 amperes, for the 12th step 6.10 amperes, for the 11th step 5.59 amperes, etc. With the apparatus of my invention, such calculations are unnecessary. The initial steps required and the full scale current value are merely set by adjustment of the knobs on the instrument in the above described manner, and the various intermediate steps obtained by simple switch adjustments. Calculation of the ammeter current for each step of calibration is unnecessary.

The potentiometer 42 in shunt with the standard instrument 41 compensates for current losses in the transformers 49, 61 and 62, and associated circuitry. This loss current is shunted through the potentiometer around the instrument 41. By experience, it has been found that this resistance adjustment is of the order of several hundred times the part of the circuit which it bypasses, which means that the error being corrected is of the order of 0.15 percent. The actual overall accuracy of the apparatus is better than 0.1%.

Having now described my invention in detail in accordance with the patent statutes, various changes and modifications will suggest themselves to those skilled in this art, and it is intended that such changes and modifications shall fall within the spirit and scope of the invention as recited in the following claims.

I claim:

1. Apparatus for applying alternating current electrical energy of selected magnitude to an alternating current instrument for calibration of the instrument comprising a stepping transformer and a full-scale set transformer each including a winding and input and output circuits, first, second and third switching means connecting selected numbers of transformer winding turns in the respective input and output circuits of the stepping transformer and the input circuit of the full-scale set transformer; a source of alternating current electrical energy having a constant amplitude and selectively connectable to a predetermined winding turn in the input circuit of the stepping transformer through the first switching means; means connecting a selected winding turn in the output circuit of the stepping transformer through the second switching means to a selected winding turn in the input of the full-scale set transformer through the third switching means; and means connecting the alternating current instrument for calibration to the output circuit of the full-scale set transformer.

2. Apparatus for applying A.-C. currents of selected magnitude to an A.-C. instrument for calibration of the instrument comprising, a stepping transformer and a full-scale set transformer each having a winding with a plurality of taps; first, second and third selector switches each having a plurality of stationary contacts and independently actuated cooperating movable contacts; means individually connecting the taps on the stepping transformer to the stationary contacts of both the said first and second switches; means individually connecting the stationary contacts of the said third switch to the taps on the full-scale set transformer; a source of constant A.-C. current; and means connecting the said source of constant current to the A.-C. instrument to be calibrated through a series circuit arrangement of the stepping and full-scale set transformers and associated selector switches.

3. The invention as recited in claim 2 wherein an equal number of turns are provided between the adjacent taps on the stepping transformer; the full-scale set transformer including first and second tapped winding sections, the first winding section having an equal number of turns between adjacent taps, the second winding section having one-tenth the turns between adjacent taps provided between adjacent taps on the first winding section.

4. The invention as recited in claim 3 wherein the full-scale set transformer includes a third winding section having the same number of turns as the number of turns provided between adjacent taps on the said second winding section; and an interpolating transformer having a tapped winding connected across the said third winding section.

5. The invention as recited in claim 2 wherein the said A.-C. instrument to be calibrated is connected to one end of full-scale set transformer winding and a center tap thereon.

6. Apparatus for calibrating an alternating current instrument comprising a stepping transformer having a winding provided with a plurality of taps, the number of winding turns between adjacent taps being equal and the number of turns between an end of the winding and the first tap being equal to one half of the number of turns between adjacent taps; a source of constant alternating current; a first half-step switch operable to one position to connect one side of the said source to the said one end of the stepping transformer winding and to another position to connect the one side of the current source to the said first tap on the stepping transformer winding; a step-down switch connecting the other side of the said source to a selected tap on the stepping transformer winding; a full-scale set transformer having a winding provided with a plurality of taps dividing the winding into sections having equal numbers of winding turns; a full-scale switch connecting a selected tap on the stepping transformer winding to a selected tap on the full-scale set transformer winding; circuit elements connecting the said instrument between one end and the center tap of the full-scale set transformer; and a second half-step switch having a movable arm operable to one position to connect the said one end of the full-scale set transformer winding to the said one end of the stepping transformer winding and to another position to connect said one end of the full-scale set transformer winding to the said first tap on the stepping transformer winding.

7. The invention as recited in claim 6 including a second winding on the full-scale set transformer, said second winding provided with a plurality of taps dividing the winding into sections having equal numbers of winding turns, the movable arm of said second one-half step switch being connected to an end of said second winding; and switch means connecting the said one end of the full-scale set transformer to a selected tap on the said second winding.

8. Apparatus for applying alternating current electrical energy of selected magnitude to an alternating current instrument for calibration of the instrument comprising a stepping transformer and a full scale set transformer each including a winding and input and output circuits, first, second and third switching means connecting selected numbers of transformer winding turns in the respective input and output circuits of the stepping transformer and the input circuit of the full scale set transformer; a source of alternating current electrical energy having a constant amplitude and connected to the input circuit of the stepping transformer through the first switching means; means connecting the output circuit of the stepping transformer through the second switching means to the input of the full scale set transformer through the third switching means; and means connecting the alternating current instrument for calibration to the output circuit of the full scale set transformer, the winding of the stepping transformer including a plurality of taps with an equal number of turns between adjacent taps; a one-half step winding section on one end of the winding of the stepping transformer comprising turns equal in number to one half of the number of turns between adjacent taps thereon; first and second one-half step switches each having first and second stationary contacts and cooperating movable contact, the respective first and second contacts of the one-half step switches being connected together and to opposite ends of the said one-half step winding section, the said source of electrical energy being connected to the movable arm of the first one-half step switch, and the said input circuit of the said full scale set transformer being connected to the movable arm of the second one-half step switch.

References Cited in the file of this patent
UNITED STATES PATENTS

| | | |
|---|---|---|
| 2,666,895 | Knopp | Jan. 19, 1954 |
| 2,769,928 | Emker | Nov. 6, 1956 |
| 2,832,036 | Cutler | Apr. 22, 1958 |